(12) United States Patent
Liebenow

(10) Patent No.: US 7,088,254 B2
(45) Date of Patent: Aug. 8, 2006

(54) SYSTEM AND METHOD FOR PROVIDING A DEVICE WITH PROTECTION FROM A WEATHER EVENT

(75) Inventor: Frank Liebenow, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/092,171

(22) Filed: Mar. 6, 2002

(65) Prior Publication Data

US 2003/0169174 A1 Sep. 11, 2003

(51) Int. Cl.
*G01W 1/00* (2006.01)

(52) U.S. Cl. .................. 340/601; 340/602; 340/539.1; 340/539.19; 340/539.28; 340/540; 361/111; 361/118; 361/119

(58) Field of Classification Search ............. 340/601, 340/602, 539.1, 539.19, 539.28, 286.02, 340/540, 825.49, 825.69, 7.48, 539; 73/170.16, 73/384; 361/1, 111, 118, 119
See application file for complete search history.

(56) References Cited

U.S. PATENT DOCUMENTS

| | | | | |
|---|---|---|---|---|
| 5,742,235 A | * | 4/1998 | Miche | 340/690 |
| 5,781,852 A | * | 7/1998 | Gropper | 455/227 |
| 5,949,851 A | | 9/1999 | Mahaffey | 379/48 |
| 6,018,699 A | | 1/2000 | Baron, Sr. et al. | 702/3 |
| 6,104,582 A | | 8/2000 | Cannon et al. | 361/1 |
| 6,112,074 A | * | 8/2000 | Pinder | 455/404.2 |
| 6,121,885 A | * | 9/2000 | Masone et al. | 340/628 |
| 6,177,873 B1 | | 1/2001 | Cragun | 340/601 |
| 6,204,761 B1 | * | 3/2001 | Vanderable | 340/539 |
| 6,278,375 B1 | | 8/2001 | Hucker | 340/601 |
| 6,286,106 B1 | | 9/2001 | Flannery | 713/310 |
| 6,329,904 B1 | * | 12/2001 | Lamb | 340/7.48 |

* cited by examiner

Primary Examiner—Hung Nguyen
(74) Attorney, Agent, or Firm—Pang Zhu; Sutter West Swantz PC LLC (57) ABSTRACT

The present invention is directed to a system and method for providing a device with protection from a weather event. A method for providing a device with protection from weather events may include receiving a notification of a weather event. At least one weather characteristic of the weather event is determined and whether at least one device of a plurality of devices is ascertained as susceptible to the determined weather characteristic. Protective action is taken to protect the at least one device susceptible to the determined weather characteristic from the notified weather event.

52 Claims, 7 Drawing Sheets

FIG. 7

SYSTEM AND METHOD FOR PROVIDING A DEVICE WITH PROTECTION FROM A WEATHER EVENT

FIELD OF THE INVENTION

The present invention generally relates to the field of device protection, and particularly to a system and method for providing a device with protection from weather events.

BACKGROUND OF THE INVENTION

Electronic devices have become increasingly more pervasive in most every aspect of modem life. There are very few aspects of home or office life that do not include some sort of electronic device. For example, a person may watch a television, use a washing machine including a microprocessor, and the like at home, as well as obtain postage from an electronic postage machine to send a letter, manipulate an electronic presentation device, scan images, and the like at the office. Further, the automobile used to transport the person from home to office may also include a wide range of electronic devices.

However, as the range and variety of electronic devices has increased, so has a consumer's reliance on them. Therefore, even with the increased productivity and functionality offered by the devices, unavailability of even one device may have a profound impact on the user. For instance, an information handling system may become inoperable, and thus limit the consumer's ability to even perform simple office functions.

One such source of inoperability is due to weather events. Certain electronic devices may be susceptible to weather events, such as lightning, water, and the like, and thus render the devices inoperable. Additionally, electronic devices may have different susceptibilities to weather characteristics, thereby making protective actions taken more suitable to protecting one device than another device.

Therefore, it would be desirable to supply a system and method for providing a device with protection from a weather event.

SUMMARY OF THE INVENTION

Accordingly, the present invention is directed to a system and method for providing a device with protection from a weather event. In a first aspect of the present invention, a method for providing a device with protection from weather events includes receiving a notification of a weather event. At least one weather characteristic of the weather event is determined and at least one device of a plurality of devices is ascertained as susceptible to the determined weather characteristic. Protective action is taken to protect the at least one device susceptible to the determined weather characteristic from the notified weather event.

In a second aspect of the present invention, a method for providing a device with protection from weather events includes receiving a notification of a weather event. The notification includes an indication of a geographic region for the weather event, the indication including at least one of data identifying a current location of the weather event and data indicating a location to which the weather event may threaten. At least one weather characteristic of the weather event is determined and at least one device of a plurality of devices is ascertained as susceptible to the determined weather characteristic. Protective action is taken to protect the at least one device susceptible to the determined weather characteristic from the notified weather event.

In a third aspect of the present invention, a system for protecting devices from weather events includes a plurality of devices communicatively coupled over a network and a weather warning detection device communicatively coupled over the network to the plurality of devices. When the weather warning device receives a notification of a weather event, the weather warning device determines at least one weather characteristic of the weather event. Whether at least one device of the plurality of devices is ascertained as susceptible to the determined weather characteristic. Protective action is taken to protect the at least one device susceptible to the determined weather characteristic from the notified weather event.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. Because of the importance and pervasiveness of electronic devices in most every aspect of modem life, interruptions caused by device inoperability may have an acute effect. One such source of inoperability is due to weather events. Certain electronic devices may be susceptible to weather events, such as lightning, water, and the like, and thus render the devices inoperable. Additionally, electronic devices may have different susceptibilities to weather characteristics, thereby making protective actions taken more suitable to protecting one device than another device.

Figure 1:
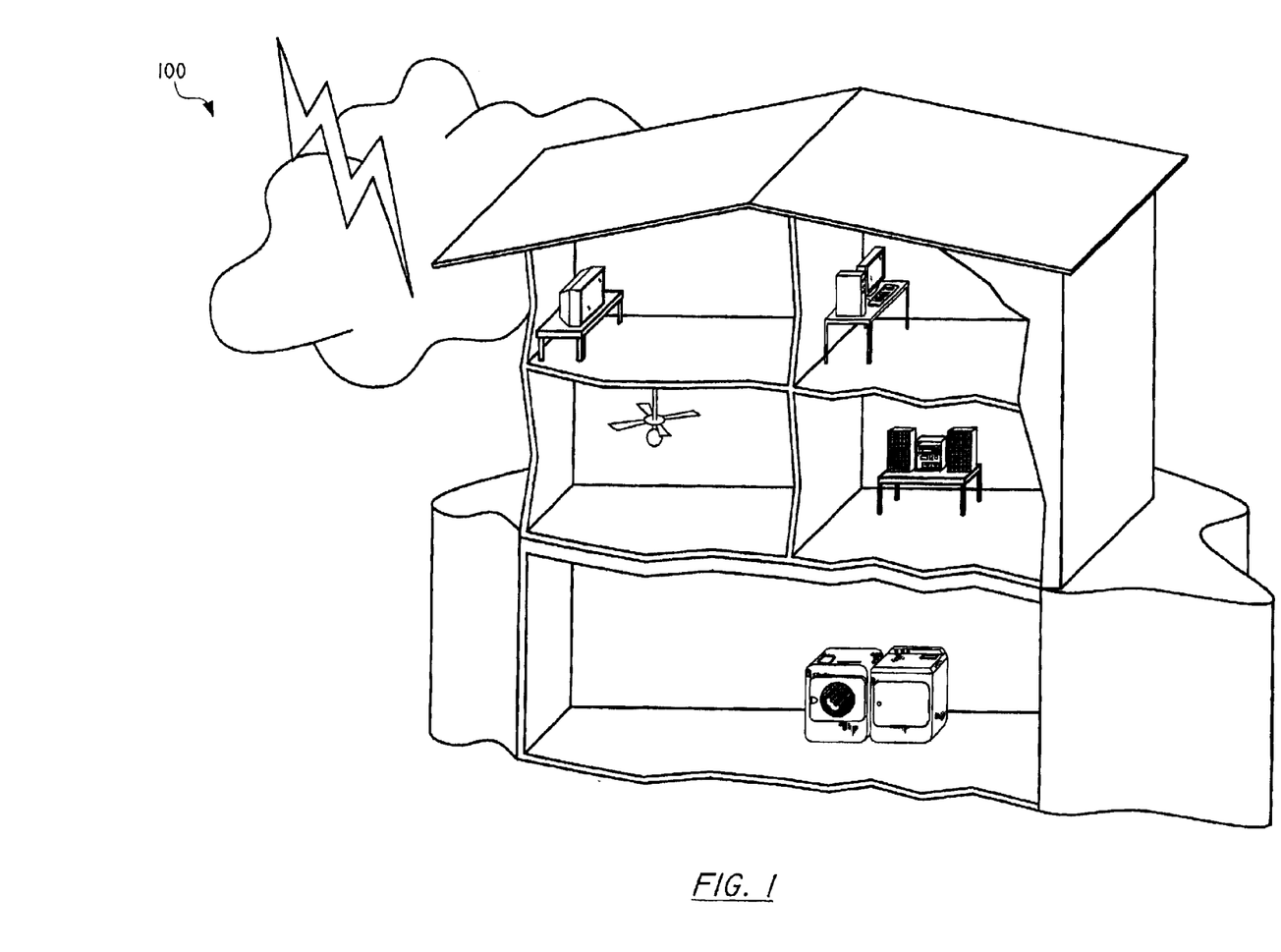
FIG. 1 is an illustration of an embodiment of the present invention wherein a plurality of devices are shown disposed within a home, the devices having varying susceptibilities to weather characteristics of weather events.

Referring now to FIG. 1, an embodiment 100 of the present invention is shown wherein a plurality of electronic devices is shown, each of which may have a different susceptibility to weather characteristics. Electronic devices may be included in a wide range of items. For example, an information handling system, such as a digital information appliance, personal digital assistance, desktop computer, laptop, Internet appliance, convergence device, and the like may be thought of as a more traditional device which includes electronic devices. However, electronic devices are also included in a wide range of "nontraditional" uses, such as washing machines, ceiling fans, furnaces, and the like. While the included electronic devices may greatly increase the functionality of the devices, it may also render the devices more susceptible to weather events.

A weather event, such as wind, rain, tornado, hurricane, show storm, wind storm, down burst, flood and the like as contemplated by a person of ordinary skill in the art may have various weather characteristics, such as lightning, strong winds, temperature changes, accumulated water from precipitation, and the like. Even electronic devices which are "sheltered" in the confines of a home, office, or the like, may be exposed to the characteristics of the weather event, such as a lightning strike to the structure, power surges, flooding, and the like. Such exposure may render an electronic device inoperable for a period of time, and may even destroy the electronic device. However, through use of the present invention, devices may be protected from these harmful characteristics.

Figure 2:
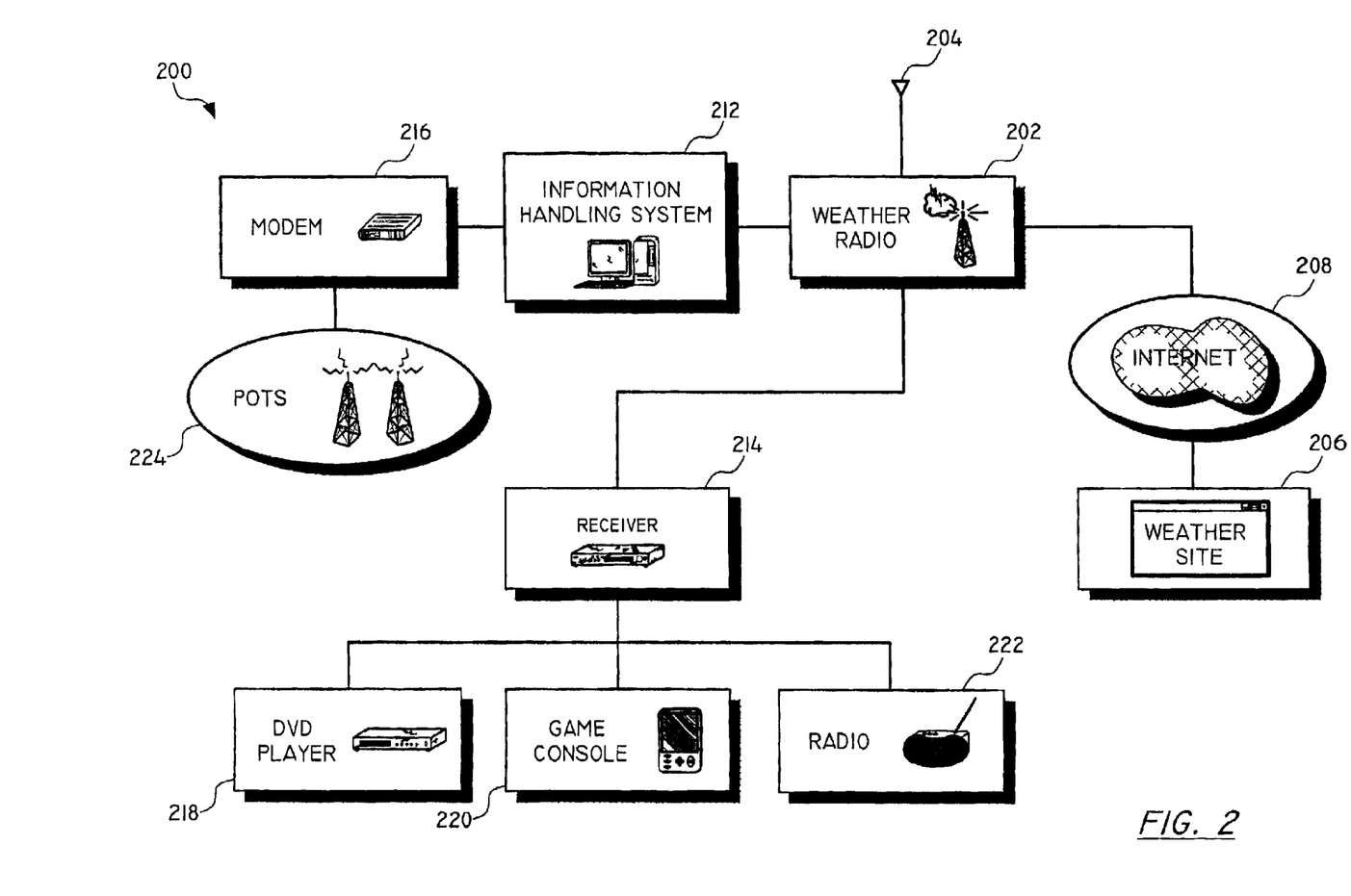
FIG. 2 is an illustration of an embodiment of the present invention wherein a system suitable for providing protection to devices accessible over a network is shown.

Referring now to FIG. 2, an embodiment 200 of the present invention is shown wherein an exemplary system for providing a device with protection from weather events is shown. A system of the present invention may employ a weather monitoring device, such as a weather radio 202. A weather monitoring device may receive data from an antenna 204, monitor a weather site 206 over the Internet 208, and the like as contemplated by a person of ordinary skill in the art. The weather monitoring device, in this instance a weather radio 202, is communicatively coupled to electronic devices over a network 210, such as an information handling system 212 and a receiver 214. The network 210 may include X.10, home phone network alliance (HPNA), FireWire, Ethernet, wireless, and the like. Additionally, the devices may be connected to additional electronic devices, such as the information handling system 212 may be connected to a modem 216, and the receiver 214 may be connected to a DVD player 218, game console 220, radio 222, and the like.

Due to the nature of the electronic devices, different electronic devices may have different susceptibilities to weather characteristics. For example, a modem 216 may be susceptible to power fluctuations through an electrical connection as well as to exposure through a telephone network 224, whereas, a game console 220, connected through a receiver 214, may be protected due to the circuitry of the receiver 214 from a power surge, and is not susceptible to telephone line surges, such as due to a lightning strike that may disable a modem 216.

Through use of the present invention, devices and/or system as a whole may take protective action to protect against current and impending weather events based on the characteristics of the weather event. For instance, a packet may be sent informing a device to shut down, a weather protection device provided to turn off a power supply, disconnect from a phone line such as providing a bridging service, and the like.

Figure 3:
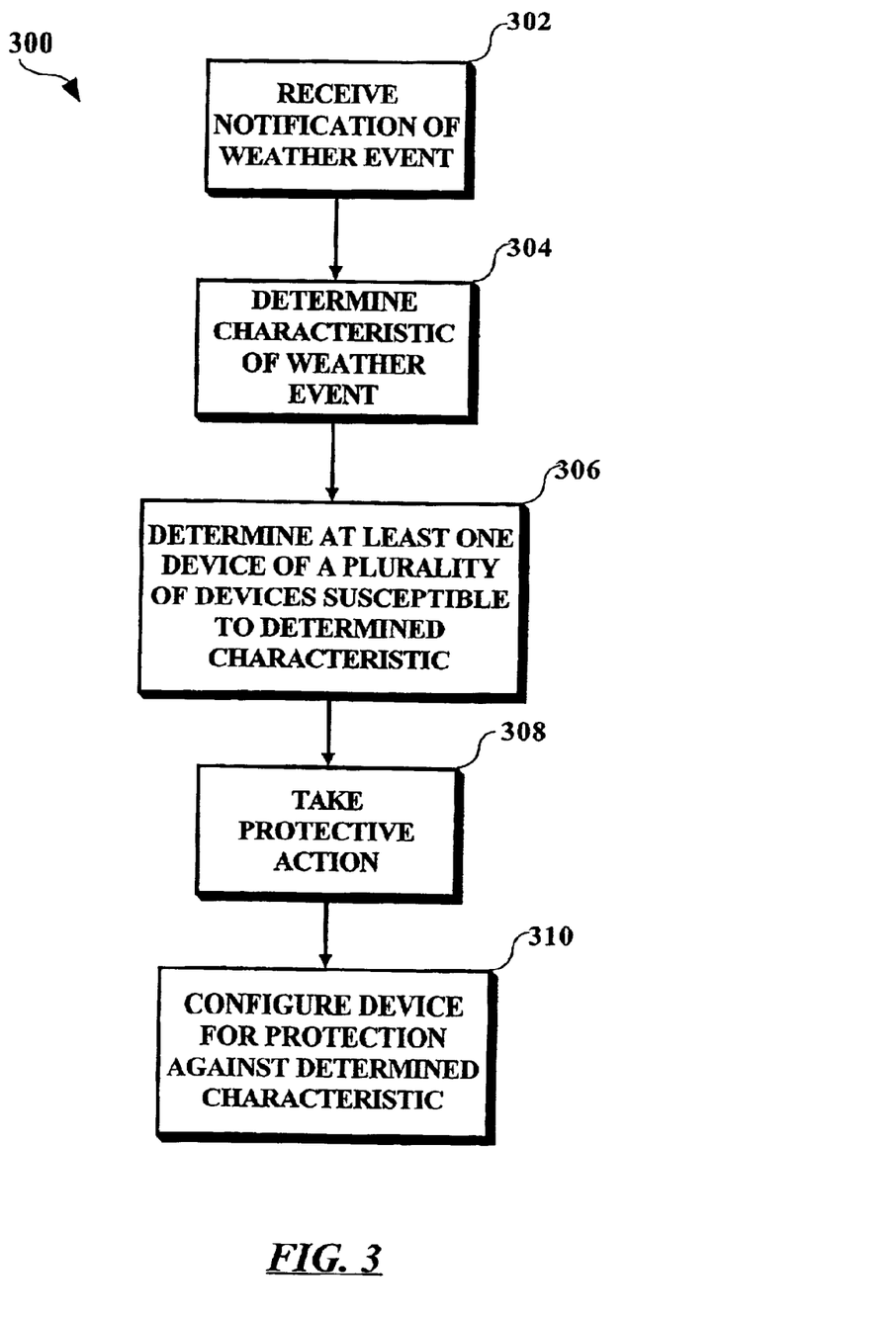
FIG. 3 is a flow diagram depicting an exemplary method of the present invention wherein a determined characteristic of a weather event is utilized to protect devices susceptible to the characteristic.

Referring now to FIG. 3, an exemplary method 300 of the present invention is shown wherein a determined characteristic of a weather event is utilized to protect devices susceptible to the characteristic. A notification of a weather event is received 302, such as from a weather radio, Internet site, early warning system, and the like. A characteristic of the weather event is determined 304.

For example, it may be determined that a thunderstorm is approaching and therefore has a weather characteristic of lightning, high winds and/or hail. A determination is then made of at least one device of a plurality of devices which is susceptible to determined characteristic 306. In the instance of lightening, for example, a modem may be determined as susceptible to both lightning strikes of telephone lines and power lines, and therefore may be more susceptible to lightening than a game console connected through a power system of a receiver. Susceptibility of devices may be stored in a database which is accessible by the system of the present invention. The susceptibility of devices may be stored in the database and include such information as to which weather characteristics the devices are susceptible, such as based on connection, location, and the like, and be arranged in a hierarchical format based on these characteristics for efficient searching.

Protective action is then taken 308, such as configuring the device for protection against the determined characteristic 310. For example, a receiver may include a fuse on its antenna and a double throw relay that may be opened so that energy from the antenna is directed through the fuse, through the relay, and to a ground. In another embodiment, the relay may be closed instead of opened to direct the antenna through the fuse and to ground. Additionally, protective actions may include disconnecting a device from an external connection, shutting down the device, saving data on the device, dampening an antenna, turning off water, gas, and the like, and other such protective actions as contemplated by a person of ordinary skill in the art.

Figure 4:
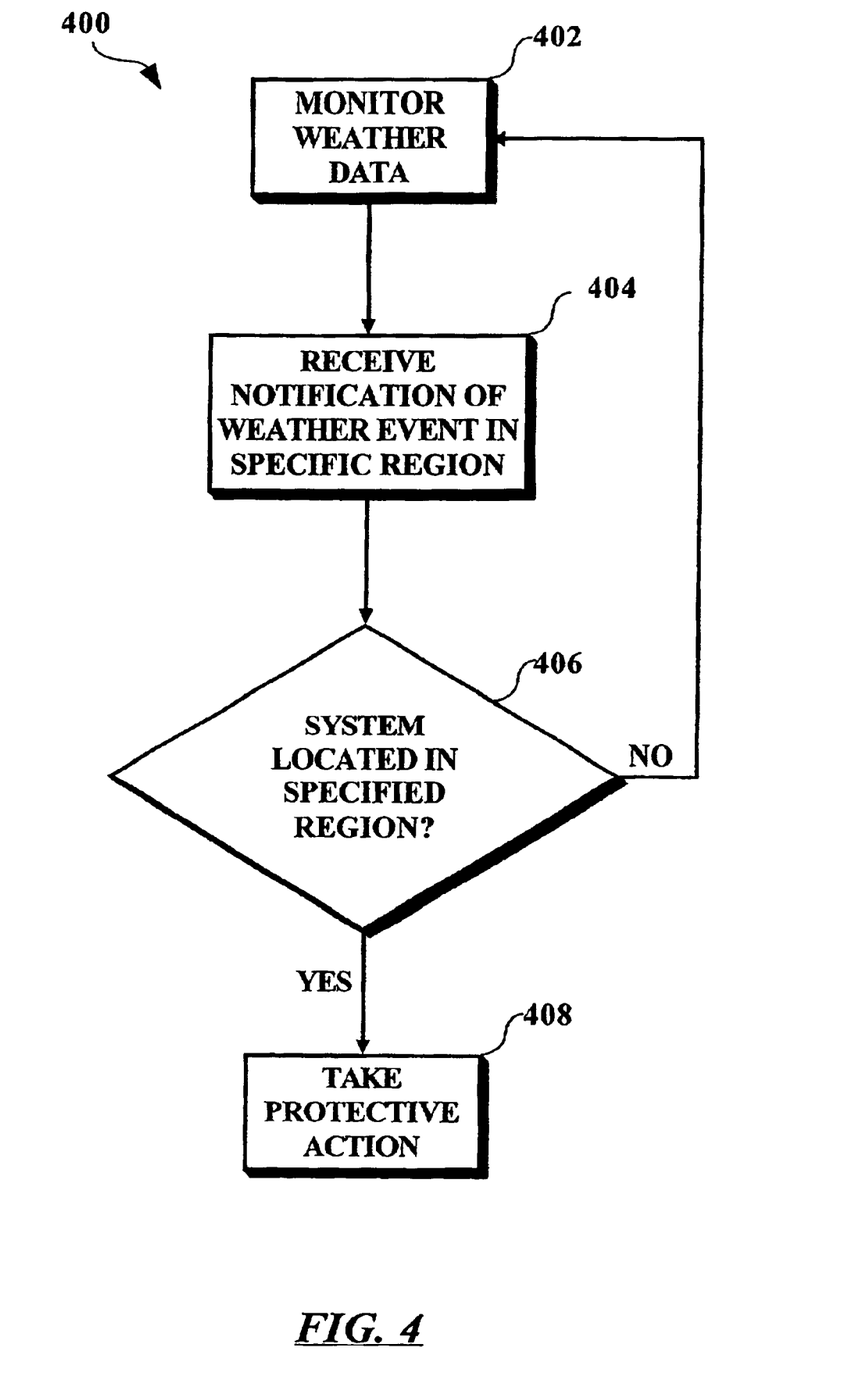
FIG. 4 is a flow diagram illustrating an exemplary method of the present invention wherein geographic region data for a weather event it utilized to provide protective action to electronic device.

Referring now to FIG. 4, an exemplary method 400 of the present invention is shown wherein geographic region data for a weather event it utilized to provide protective action to electronic device. Weather data is monitored 402 and a notification is received of a weather event in a specific region 404. The notification may be received from a broadcast source, Internet, and the like. The specific region may be designated by an indication of a geographic region for the weather event, which may include where the weather event is located and which geographic regions may be threatened by the weather event. Geographic region may be indicated utilizing a variety of mechanisms, such as country, state, county, zip code, zip+4 code, street address, global positioning system coordinates, and the like as contemplated by a person of ordinary skill in the art.

A determination is then made if the system is located in the specified region 406. If the system is not located in the specified region 406, the system may continue to monitor weather data 402 for any changes. If the system is located in the specified region 406, protective action may be taken 408, such as the actions previously described. In this way, a system of the present invention may take protective actions when necessary, thereby limiting unwanted interruptions of device functionality. Further, because the present invention contemplates a wide range of geographic regions, such a determination may be further tailored to occur in instances of more probable threats to the devices.

Figure 5:
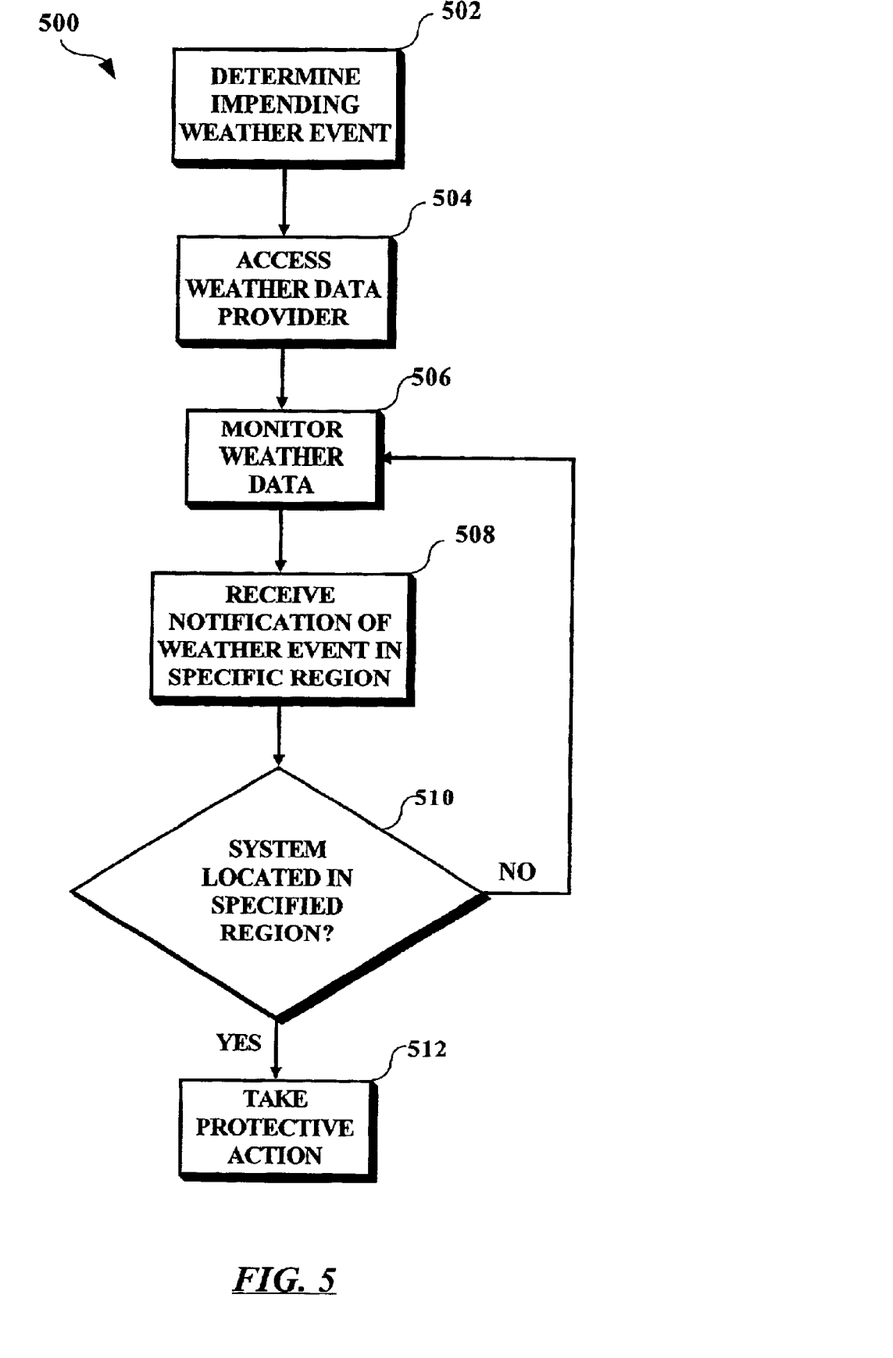
FIG. 5 is a flow diagram depicting an exemplary method of the present invention wherein in response to a determined impending weather event, weather data is monitored for a specific region.

Referring now to FIG. 5, an exemplary method 500 of the present invention is shown wherein in response to a determined impending weather event, weather data is monitored for a specific region. A determination is made of an impending weather event 502. For instance, a weather radio may receive a warning; local weather instruments may detect a weather change, such as barometric pressure; and the like. In response to the received warning, a weather data provider is accessed 504, such as by accessing a web site of weather data.

The weather data is monitored 506 and a notification is received of a weather event in a specific region 508. If the system is not located in the specific region 510, the system may continue to monitor weather data 506. However, if the system is located in the specific region 510, such as indicated by zip code, the system may take protective action 512. In this way, a local determination of weather condition may be made, and in response to the determination, confirmation of a weather event may be obtained from a second source. For example, if a weather monitoring device detected a drop in barometric pressure outside a desired parameter, the system may obtain information from a more accurate source, such as a local weather station, which may have access to more comprehensive equipment, such as radar.

Figure 6:
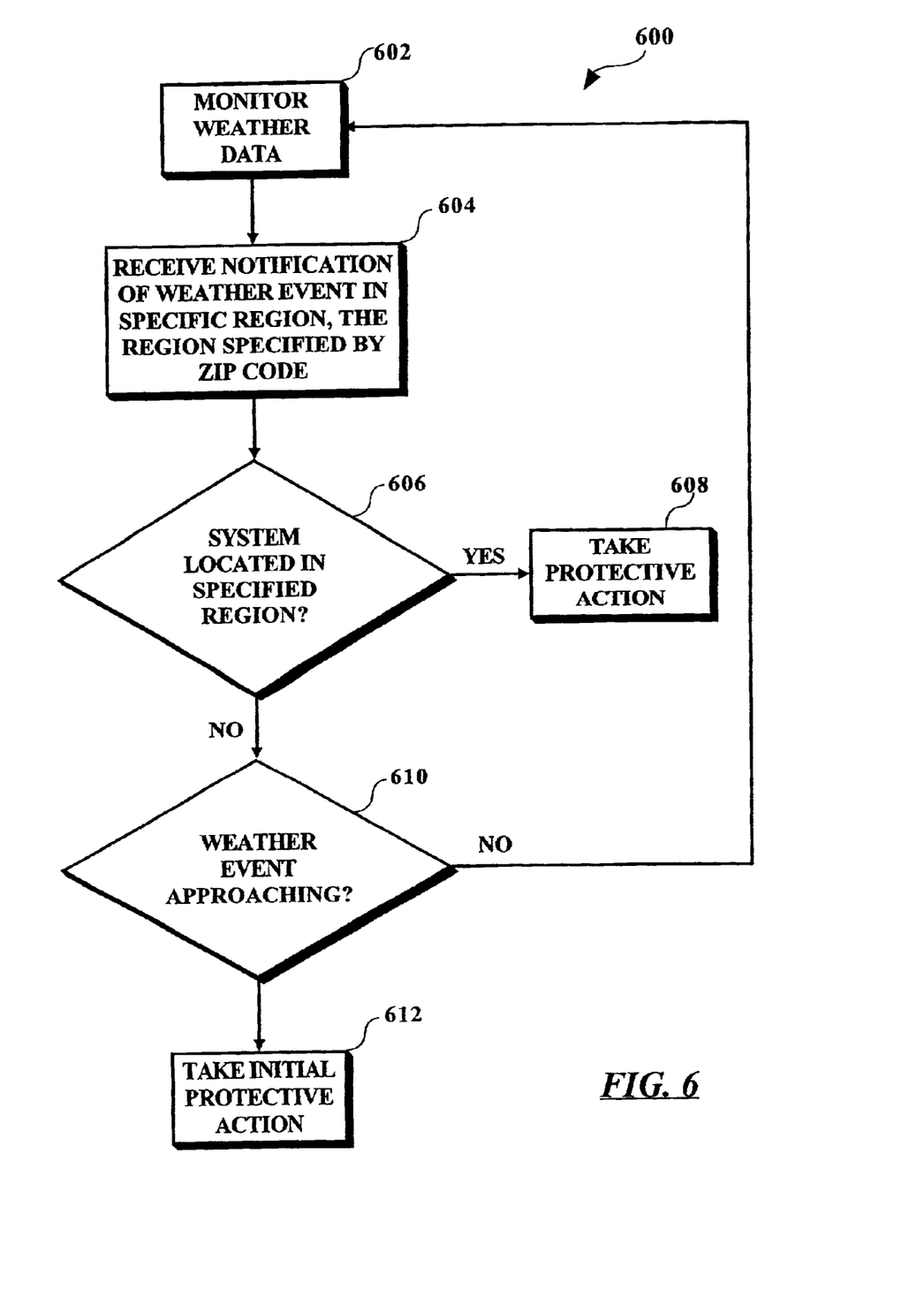
FIG. 6 is a flow diagram of an exemplary method of the present invention wherein initial protective actions may be taken in response to an approaching weather event.

Referring now to FIG. 6, an exemplary method 600 of the present invention is shown wherein initial protective actions may be taken in response to an approaching weather event. Weather data is monitored 602 and a notification is received of a weather event in a specific region, the region specified by a zip code indicator 604. If the system is located in the specified region 606, protection action is taken for the devices 608.

However, if the system is not located in the specified region 606, a determination if made for whether the weather event is approaching 610. For instance, a determination may be made by storm movement, positions indicated by radar, changing weather conditions, and the like as contemplated by a person of ordinary skill in the art. If the weather event is not approaching 610, the system may be configured to continue monitoring weather data 602, such as for a specified period of time.

However, if the weather event is approaching, initial protective actions may be taken 612. Initial protective actions may include unobtrusive actions of a lesser severity that the protective actions taken if the weather event was currently located in the specified area. For instance, an initial protective action may include saving data, shutting down devices determined to have a high susceptibility to a weather characteristic, unnecessary devices, and the like without departing from the spirit and scope of the present invention. In this way, devices may be protected in various stages, such as stages in a hierarchy of device susceptibility in a database of the present invention.

Figure 7:
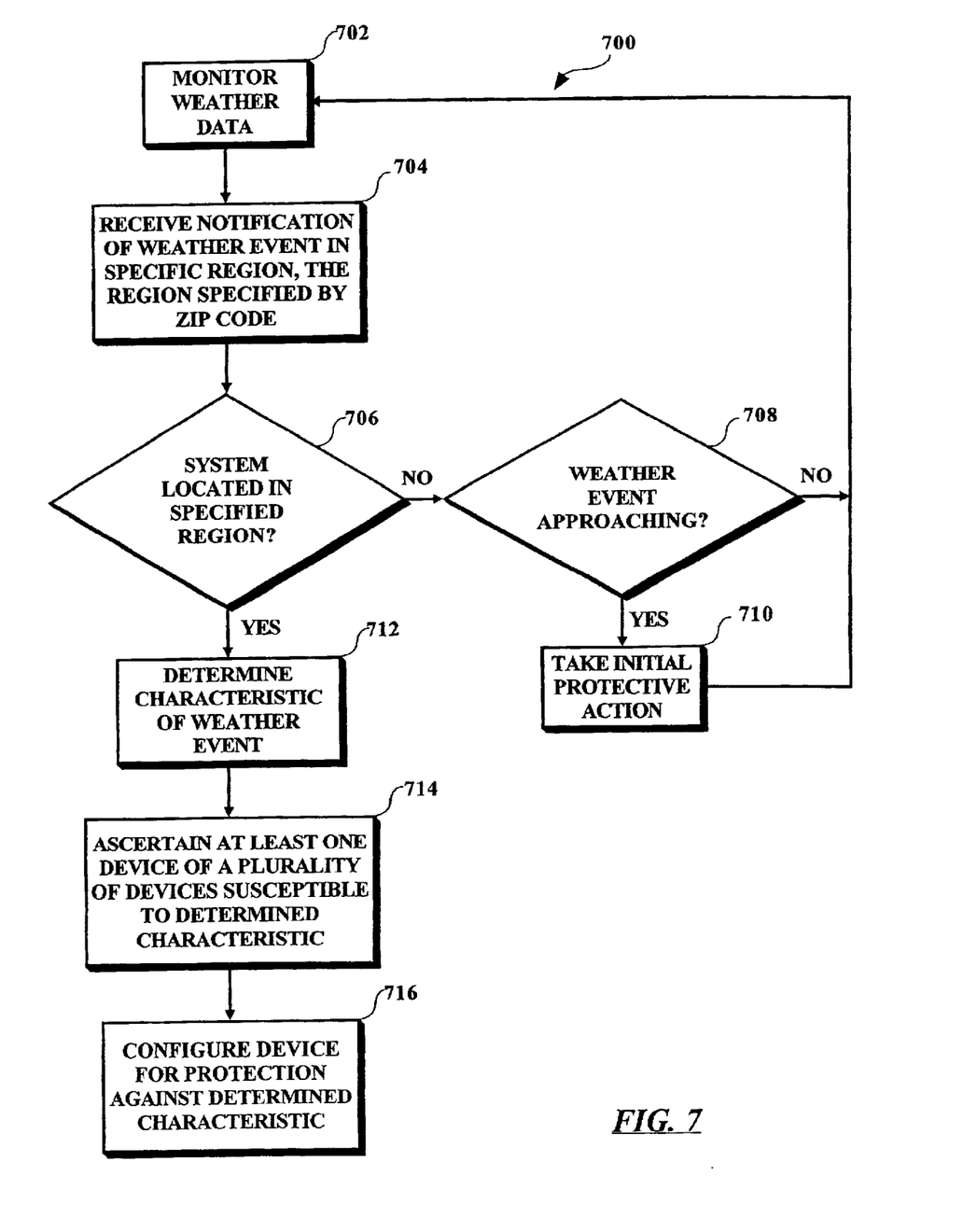
FIG. 7 is a flow diagram depicting an exemplary method of the present invention wherein a notification of a weather event including a geographic indication is utilized to determine whether a system is located in the specified region and take initial protective actions and protective actions accordingly.

Referring now to FIG. 7, an exemplary method 700 of the present invention is shown wherein a notification of a weather event including a geographic indication is utilized to determine whether a system is located in the specified region and take initial protective actions and protective actions accordingly. Weather data is monitored 702 and a notification is received of a weather event in a specific region, the region specified by a zip code 704. If the system is not located in the specified region 706, a determination is made to ascertain if the weather event is approaching 708, and if so, initial protective actions are taken 710.

The system may continue to monitor weather 702. Thus, if the weather event moves to the specified region 706, a characteristic of the weather event may be determined 712. At least one device of a plurality of devices is ascertained as susceptible to the determined characteristic 714. Protective action may then be taken by the device, such as configuring the device for protection against the determined characteristic 716.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an information handling system and transmitted over a local area network or a wide area network, such as the Internet, when desired by the user.

Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing a device with protection from weather events, comprising:
   receiving a notification of a weather event;
   determining at least one weather characteristic of the weather event;
   ascertaining whether at least one device of a plurality of devices is susceptible to the determined weather characteristic; and
   taking protective action to protect the at least one device susceptible to the determined weather characteristic from the notified weather event,
   wherein ascertaining includes querying a database of devices, the database including an indication of susceptibility of the device to a weather characteristic,
   wherein the plurality of devices includes devices of different susceptibilities,
   wherein the database includes an indication that a first device is susceptible to lightning, and wherein the database includes an indication that a corresponding protective action is disconnecting the device from at least one of an external power connection or an external communication connection.

2. The method as described in claim 1, wherein the notification is received from a weather monitoring device.

3. The method as described in claim 2, wherein the weather monitoring device includes a weather radio.

4. The method as described in claim 1, wherein the weather characteristic of the weather event includes at least one of lightning, flooding, winds, precipitation or temperature.

5. The method as described in claim 1, wherein protective action includes at least one of, disconnecting the device from an external connection, shutting down the device, saving data on the device, dampening an antenna turning off a water supply and turning off of a gas supply.

6. The method as described in claim 1, wherein the notification of the weather event includes an indication of a geographic region for the weather event.

7. The method as described in claim 6, wherein the indication includes at least one of data identifying current location of the weather event and data indicating a location to which the weather event may threaten.

8. The method as described in claim 6, wherein the graphic region is identified based on at least one of county and zip code.

9. The method as described in claim 1, further comprising:
   determining an approaching weather event, the determination made by a local weather monitoring device, the local weather monitoring device monitoring weather conditions in a corresponding region to the device; and
   accessing a weather data provider in response to the determined impending weather event, the weather data provider suitable for providing a notification of a weather event.

10. The method as described in claim 1, wherein a weather event is approaching, taking an initial protective action of at least one device of the plurality of devices.

11. The method as described in claim 1, wherein ascertaining includes receiving the indication of susceptibility.

12. The method as described in claim 1, wherein the protective action taken is disconnecting the device from an external connection.

13. The method as described in claim 1, wherein the protective action taken is shutting down the device.

14. The method as described in claim 1, wherein the protective action taken is saving data on the device.

15. The method as described in claim 1, wherein the protective action taken is dampening an antenna.

16. The method as described in claim 1, wherein the protective action taken is turning off a water supply.

17. The method as described in claim 1, wherein the protective action taken is turning off of a gas supply.

18. A method for providing a device with protection from weather events, comprising:
   receiving a notification of a weather event, the notification including an indication of a geographic region for the weather event, the indication including at least one of data identifying a current location of the weather event and data indicating a location to which the weather event may threaten;
   determining at least one weather characteristic of the weather event;
   ascertaining whether at least one device of a plurality of devices is susceptible to the determined weather characteristic; and
   taking protective action to protect the at least one device susceptible to the determined weather characteristic from the weather event,
   wherein ascertaining includes querying a database of devices, the database including an indication of susceptibility of the device to a weather characteristic,
   wherein the plurality of devices includes devices of different susceptibilities,
   wherein the database includes an indication that a first device is susceptible to lightning, and wherein the database includes an indication that a corresponding protective action is disconnecting the device from at least one of an external power connection or an external communication connection.

19. The method as described in claim 18, wherein the notification is received from a weather monitoring device.

20. The method as described in claim 19, wherein the weather monitoring device includes a weather radio.

21. The method as described in claim 18, wherein the weather characteristic of the weather event includes at least one of lightning, flooding, winds, precipitation or temperature.

22. The method as described in claim 18, wherein protective action includes at least one of, disconnecting the device from an external connection, shutting down the device, saving data on the device, dampening an antenna, turning off a water supply and turning off a gas supply.

23. The method as described in claim 18, wherein the geographic region is identified based on at least one of county and zip code.

24. The method as described in claim 18, further comprising:
   determining an approaching weather event, the determination made by a local weather monitoring device, the local weather monitoring device monitoring weather conditions in a corresponding region to the device; and
   accessing a weather data provider in response to the determined impending weather event, the weather data provider suitable for providing a notification of a weather event.

25. The method as described in claim 18, wherein a weather event is approaching, taking an initial protective action of at least one device of the plurality of devices.

26. A The method as described in claim 18, wherein ascertaining includes receiving the indication of susceptibility.

27. A system for protecting devices from weather events, comprising:

a plurality of devices communicatively coupled over a network; an a weather warning detection device communicatively coupled over the network to the plurality of devices, wherein when the weather warning detection device receives a notification of a weather event, the weather warning detection device determines at least one weather characteristic of the weather event and ascertains whether at least one device of the plurality of devices is susceptible to the determined weather characteristic by querying a database of devices, the database including an indication of susceptibility of the plurality of devices to the at least one weather characteristic and takes protective action to protect the at least one device susceptible to the determined weather characteristic from the notified weather event, wherein the plurality of devices includes devices of different susceptibilities, wherein the database includes an indication that a first device is susceptible to lightning, and wherein the database includes an indication that a corresponding protective action is disconnecting the device from at least one of an external power connection or an external communication connection.

28. The system as described in claim 27, wherein the notification is received from at least one of a weather detector included with the weather warning detection device; and a website.

29. The system as described in claim 27, wherein the weather warning detection device takes protective action to protect the at least one device susceptible to the determined weather characteristic from the notified weather event and does not take protective action to protect the at least one device of the plurality of devices which is ascertained as not susceptible to the determined weather characteristic from the notified weather event.

30. The system as described in claim 27, wherein the weather characteristic of the weather event includes at least one of lightning, flooding, winds, precipitation or temperature.

31. The system as described in claim 27, wherein protective action includes at least one of, disconnecting the device from an external connection, shutting down the device, saving data on the device, dampening an antenna, turning off a water supply and turning off a gas supply.

32. The system as described in claim 27, wherein the notification of the weather event includes an indication of a geographic region for the weather event.

33. The system as described in claim 32, wherein the indication includes at least one of data identifying current location of the weather event and data indicating a location to which the weather event may threaten.

34. The system as described in claim 32, wherein the geographic region is identified based on at least one of county and zip code.

35. The system as described in claim 27, further comprising:

determining an approaching weather event, the determination made by a local weather monitoring device, the local weather monitoring device monitoring weather conditions in a corresponding region to the device; and accessing a weather data provider in response to the determined impending weather event, the weather data provider suitable for providing a notification of a weather event.

36. The system as described in claim 27, wherein a weather event is approaching, taking an initial protective action of at least one device of the plurality of devices.

37. The system as described in claim 27, wherein protective action includes at least one of dampening an antenna, turning off a water supply and turning off a gas supply.

38. The system as described in claim 27, wherein protective action includes dampening an antenna and at least one of disconnecting the device from an external connection, shutting down the device, saving data on the device, turning off a water supply and turning off a gas supply.

39. The system as described in claim 27, wherein protective action includes at least two of disconnecting the device from an external connection, shutting down the device, saving data on the device, dampening an antenna, turning off a water supply and turning off a gas supply.

40. A system for configuring a device for protection from weather events, comprising:

an information handling system;

a weather radio for monitoring the weather, the weather radio having an antenna, the weather radio being communicatively coupled to the information handling system; and a receiver communicatively coupled to the weather radio, wherein the receiver controls at least one electronic device, wherein when the weather radio receives a notification of a weather event, a weather warning device determines at least one weather characteristic of the weather event and ascertains susceptibility of the at least one electronic device to a weather characteristic by querying a database of devices, the database including indication of susceptibility of the at least one electronic devices to the at least one weather characteristic and takes any protective action determined to be needed for the information handling system, the receiver, and the at least one electronic device to the determined weather characteristic and takes protective action to protect those device susceptible to the determined weather characteristic from the notified weather event, wherein the database includes an indication that a first device is susceptible to lightning, and wherein the database includes an indication that a corresponding protective action is disconnecting the device from at least one of an external power connection or an external communication connection.

41. The system of claim 40, wherein the weather radio is communicatively coupled to a weather site through Internet.

42. The system of claim 41, wherein the at least one electronic device includes at least two of the group consisting of a digital versatile disk (DVD) player, a game console, and a radio.

43. The system of claim 42, wherein the information handling system is connected to a telephone network through a modem.

44. The system of claim 40, wherein the plurality of devices includes devices of different susceptibilities.

45. The system of claim 40, wherein the information handling system is a digital information appliance.

46. The system of claim 40, wherein the information handling system is a personal digital assistant.

47. The system of claim 40, wherein the information handling system is an Internet appliance.

48. The system of claim 40, wherein the information handling system is a convergence device.

49. A method for providing a device with protection from weather events, comprising:

receiving a notification of a weather event;

determining at least one weather characteristic of the weather event;

ascertaining whether at least one device of a plurality of devices is susceptible to the determined weather characteristic; and taking protective action to protect the at least one device susceptible to the determined weather characteristic from the notified weather event, wherein ascertaining includes querying a database of devices, the database including an indication of susceptibility of the device to a weather characteristics, wherein the plurality of devices includes devices of different susceptibilities, wherein the database includes an indication that a first device is not susceptible to weather characteristics, and wherein the protective action taken comprises no action.

50. A method for providing a device with protection from weather events, comprising:

receiving a notification of a weather event;

determining at least one weather characteristic of the weather event;

ascertaining whether at least one device of a plurality of devices is susceptible to the determined weather characteristic; and taking protective action to protect the at least one device susceptible to the determined weather characteristic from the notified weather event, wherein ascertaining includes querying a database of devices, the database including an indication of susceptibility of the device to a weather characteristic, wherein the plurality of devices includes devices of different susceptibilities, and wherein the database of devises includes an indication that a first device is susceptible to a first weather characteristic, and includes an indication that a second device is susceptible to a second weather characteristic, and the first weather characteristic and the second weather characteristic are different weather characteristics.

51. A method for providing a device with protection from weather events, comprising:

receiving a notification of a weather event;

determining at least one weather characteristic of the weather event;

ascertaining whether at least one device of a plurality of devices susceptible to the determined weather characteristic; and taking protective action to protect the at least one device susceptible to the determined weather characteristic from the notified weather event, wherein ascertaining includes querying a database of devices, the database including an indication of susceptibility of the device to a weather characteristic, wherein the plurality of devices includes devices of different susceptibilities, wherein the database includes an indication that a first device is susceptible to flood, and wherein the database includes an indication that a corresponding protective action is disconnecting the device from an external power connection.

52. A method for providing a device with protection from weather events, comprising:

receiving a notification of a weather event;

determining at least one weather characteristic of the weather event;

ascertaining whether at least one device of a plurality of devices is susceptible to the determined weather characteristic; and taking protective action to protect the at least one device susceptible to the determined weather characteristic from the notified weather event, wherein ascertaining includes querying a database of devices, the database including an indication of susceptibility of the device to a weather characteristic, wherein the plurality of devices includes devices of different susceptibilities, wherein the database includes an indication that a first device is susceptible to flood, and wherein the database includes an indication that a corresponding protective action is shutting off gas.

* * * * *